March 23, 1954
R. SCHUSTER
2,672,898
EDGE-DRESSING AND PROFILING APPARATUS
DRIVEN BY AN ELECTRIC MOTOR
Filed April 21, 1952
3 Sheets-Sheet 1
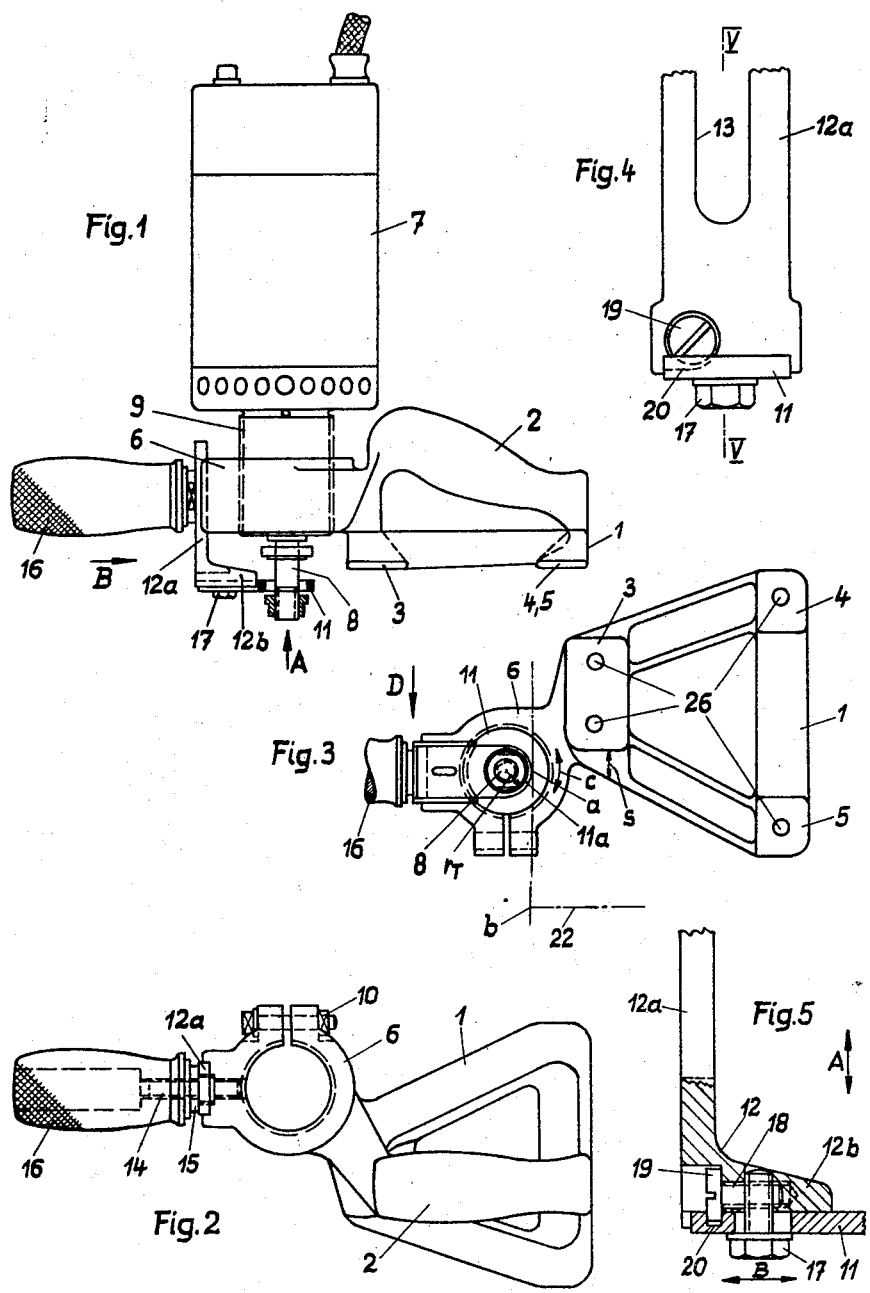
Inventor
R. Schuster March 23, 1954  R. SCHUSTER  2,672,898
EDGE-DRESSING AND PROFILING APPARATUS
DRIVEN BY AN ELECTRIC MOTOR
Filed April 21, 1952  3 Sheets-Sheet 2
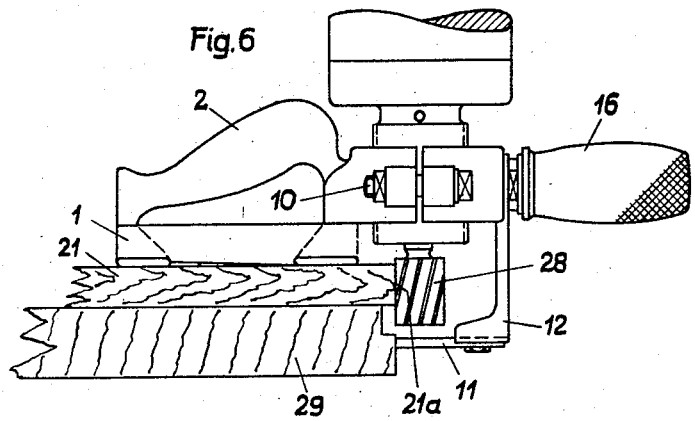
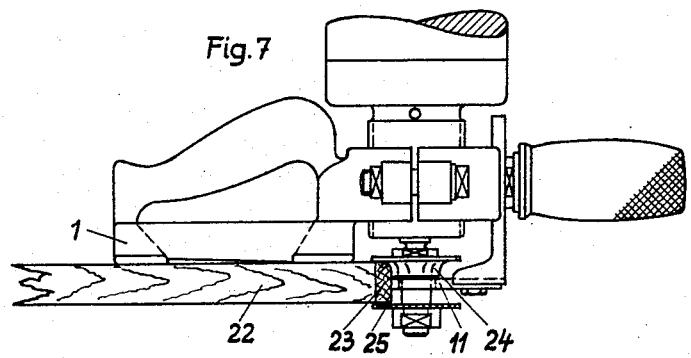
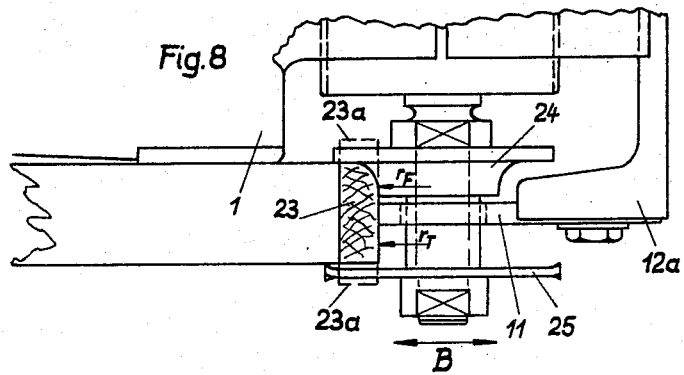
Inventor
R. Schuster March 23, 1954 R. SCHUSTER 2,672,898
EDGE-DRESSING AND PROFILING APPARATUS
DRIVEN BY AN ELECTRIC MOTOR
Filed April 21, 1952 3 Sheets-Sheet 3
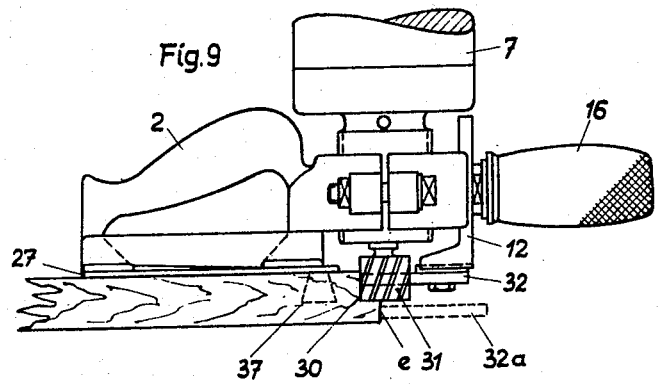
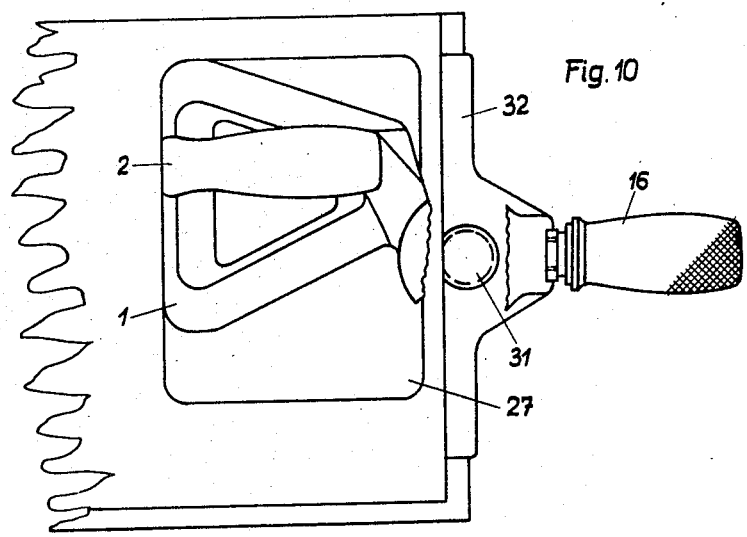
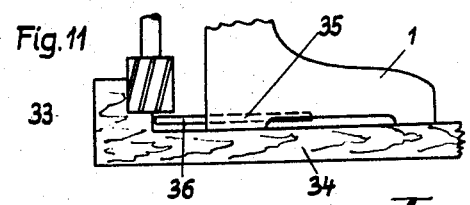
Inventor
R. Schuster Patented Mar. 23, 1954

2,672,898

UNITED STATES PATENT OFFICE 2,672,898

EDGE-DRESSING AND PROFILING APPARATUS DRIVEN BY AN ELECTRIC MOTOR

Roman Schuster, Neu-Ulm, Germany

Application April 21, 1952, Serial No. 283,290

Claims priority, application Germany April 27, 1951

11 Claims. (Cl. 144—136)

This invention relates to an edge-dressing and profiling apparatus driven by an electric motor and advanced by hand, for woodworking.

Heretofore, the finishing of glued-on peripheral parts and the dressing of edges of furniture and the like have either been effected by means of hand tools such as planes and the like, or else the work-piece had to be placed on a suitable machine, for instance a milling machine. The finishing of door rabbets and the like, also, for the most part had to be effected by hand by means of rabbet planes and the like. The present invention relates to an apparatus for dressing and profiling edges which is driven by an electric motor and is held and guided by hand, and which considerably facilitates the abovementioned operations, i. e. the dressing and profiling of glued-on peripheral parts or other wooden parts, the dressing of veneered edges, the trimming of veneers, the manufacture of all kinds of frames, and the final dressing of rabbets, for instance on doors, door frames and windows.

The edge-dressing and profiling apparatus according to the invention consists of a base plate having slip surfaces on its under side and a hand grip on top, of a unit consisting of an electric motor and a milling cutter spindle perpendicular to the base plate, which unit is mounted outside the base plate in a lateral extension thereof and is vertically (axially) adjustable, and of an annular feeler fastened to the lateral extension and disposed concentrically with the milling cutter spindle and capable of being radially adjusted in the direction of the base plate, the external diameter of this annular feeler corresponding to the fly circle diameter of the milling cutter.

This new apparatus and the varied uses thereof are more particularly described hereunder with reference to embodiments chosen by way of example and illustrated in the accompanying drawings, in which:

Figure 1 is a lateral elevation of an apparatus for dressing and profiling edges driven by an electric motor, Figure 2 is a plan view thereof (without the electric motor), Figure 3 is a view in elevation from below, seen in the direction A in Figure 1, Figure 4 is a view in elevation of a detail, seen in the direction B in Figure 1 (on a larger scale), Figure 5 is a longitudinal section on line V—V of Figure 4, Figures 6 and 7 show different operations being performed by the apparatus illustrated in Figures 1 to 3, Figure 8 shows details of Figure 7 on a larger scale, Figure 9 shows the apparatus, illustrated in Figures 1 to 3, performing a different milling operation, Figure 10 is a plan view thereof, and Figure 11 is a fragmentary diagrammatic illustration of the new apparatus performing yet another milling operation.

In the drawings, 1 is a base plate having at the top a handle 2 and at the bottom slip surfaces 3 to 5 on which the apparatus illustrated rests when it is placed on the work-piece which is to be treated. The base plate 1 is provided with a lateral extension 6 in which is mounted a unit consisting of an electric motor and a milling cutter spindle and disposed perpendicularly to the base plate. This unit consists of a high-speed electric motor 7 and a milling cutter spindle 8. This spindle is preferably mounted removably in a threaded neck 9 of the motor. In the advantageous embodiment illustrated, the lateral extension 6 is formed as a slotted clamp ring having an internal thread, in which the threaded neck 9 having an external thread is adjustable in an axial direction and capable of being fixed rigidly by means of a screw bolt 10. By this axial adjustment, which alternatively may be effected in other ways, the tool (not shown in Figures 1 to 3) fastened to the milling cutter spindle 8 can be accurately adjusted vertically relatively to the slip surfaces 3 to 5 and therefore to the work-piece. In order to obtain exact horizontal adjustment of the milling tool relatively to the work-piece during the treatment of edges and like work, an annular feeler 11 is provided. For attaching this annular feeler 11 to the lateral extension, in the embodiment illustrated an angular holder 12 is used which has a long arm 12a and a short arm 12b (see also Figures 4 and 5). The arm 12a is provided with a longitudinal slot 13 which is used for longitudinal sliding or adjustment in the direction A. For attaching this holder to the lateral extension 6 there is provided a screw bolt 14 fixed in the extension and a nut 15. A handle 16 is screwed onto the free end of this screw bolt 14, and this handle 16 together with the handle 2 enable the apparatus to be handled conveniently and safely.

According to the drawing the annular feeler 11 is formed as a slide and is mounted in the corresponding guide in the holder arm 12b, i. e. the feeler is capable of being slid and adjusted in the direction B. A screw bolt 17 is used for clamping the annular feeler 11 on the holder 12. As may be seen from Figures 4 and 5, there is also provided a fillister head screw 18 for minute adjustment of the annular feeler 11, the head 19 of this screw engaging in a corresponding groove 20 in the annular feeler.

Figures 6 and 7 illustrate by way of example the use of the new apparatus in the treatment or dressing and profiling of the edges of wooden slabs 21 and 22 or the like. In these operations the apparatus is placed on the work-pieces 21 and 22 so as to rest on the base plate, i. e. on the slip surfaces 3 to 5 thereof. In the example illustrated in Figure 7 a wooden slab 22 is provided with glued-on peripheral parts 23 which are dressed and profiled (rounded off) at the top and trimmed at the bottom. For this purpose a suitable cutter 24, and also a saw blade 25, are fastened to the milling cutter spindle 8. Alternatively, a milling cutter similar to 24 may be attached instead of the saw blade 25, if the bottom edge also of the part 23 is to be dressed and rounded off. As is shown, the annular feeler 11 is situated between the tools 24 and 25. The external (in this case semicylindrical) surface 11a (Figure 3) of this annular feeler corresponds exactly to the fly circle diameter of the cutter, and the feeler is exactly concentric with the cutter, i. e. as shown in Figure 8 the fly circle radius rF of the milling cutter 24 is exactly equal to the radius rT of the annular feeler. Because of the form of the annular feeler 11 and the fact that this feeler can be accurately adjusted, it is possible to effect even the most delicate operations, for instance the dressing of thin high-class veneers, by means of the milling tool without damaging these veneers. If the milling tool after wearing out is re-ground and the fly circle diameter thereof somewhat reduced thereby, the annular feeler 11 can be accurately adjusted to this new fly circle diameter, by being moved in the direction B. In this respect the apparatus according to the invention is superior to known milling devices having approach rings placed on the milling cutter spindle, since the diameter of these rings cannot be altered and therefore when the cutter has been re-ground the rings can no longer be used.

In Figure 3, the edge of a wooden slab 22 or the like, which is to be treated, is indicated by dot-dash lines. Thus, the apparatus can be swung in the plane of the drawing, in the direction of the arrow C, about the point a against which the annular feeler bears. But since as explained above the semi-annular surface 11a of the annular feeler 11 is always concentric with the fly circle of the cutter, such swinging of the apparatus (even over a large angular range, for instance from 60° to 90°) has no effect on the milling operation, i. e. even if such swinging takes place the outer edge of a veneer or glued-on part cannot be damaged. Accordingly, the new apparatus also renders possible the dressing and profiling of work-pieces having sharp corners, so that for instance according to Figure 3 the apparatus provided with the annular feeler 11 can even be taken around the sharp corner b without damage to this corner.

In the example according to Figure 8 glued-on peripheral parts 23 have to be dressed and profiled which originally have portions 23a, indicated in broken lines, projecting beyond the plate 22. But these projecting edges in no way impair the operation of the new apparatus, since the base plate 1 having the slip surfaces 3 to 5 is arranged unilaterally and at a distance from the milling cutter spindle. According to Figure 3, preferably three slip surfaces 3, 4 and 5 are provided so that as a result there is secured three-point support on the work-piece. To make it possible also to machine slabs having peripheral glued-on parts on all sides, according to Figure 3 the slip surface nearest to the milling cutter is so arranged as to be set back by the amount s, relatively to the milling cutter spindle, in the direction opposite to the direction of advance D.

Furthermore attachment means, for instance threaded holes 26 and screw-bolts co-operating therewith, may be provided to enable a larger slide plate, for instance as indicated in Figure 10, to be attached to these slip surfaces. These threaded holes 26 may be used for attaching a still larger plate so that said plate can be used as a work table if the new apparatus is for instance clamped to a joiner's bench by means of the handle 2 and used in a stationary and inverted position as a milling cutter for slats and the like.

In the example of operation illustrated in Figure 6, a cylindrical milling cutter 28 is provided which is being used for machining the edges 21a along their whole length. In this case the work-piece 21 is clamped on to a slab 29 which serves as a former against which the feeler 11 bears. Instead of a cylindrical milling cutter, a form cutter may alternatively be used if required, if the edge is to be formed with a definite profile. In the embodiment according to Figure 9, a rabbet 30 in a door, window-frame or the like is being finished by means of a cylindrical cutter 31. In this case, instead of the annular feeler described above a guide rule 32 is attached to the holder 12, which rule together with the larger slide plate 27 renders possible accurate finishing of the rabbet 30. If it is required not merely to plane down such a rabbet but actually to cut one out of the solid wood, the guide rule is set lower, as indicated in broken lines at 32a, and in that case slides along the surface e of the work-piece.

By means of the new apparatus it is also possible to cut grooves in the top side of a work-piece, for instance a dovetail groove as indicated at 37 in Figure 9.

To enable a rabbet 33 to be cut in a work-piece 34, as in Figure 11, by means of the new apparatus, a guide, indicated at 35, is provided in the base plate 1, in which guide the annular feeler or a guide rule 36 can be mounted in such a manner as to be capable of sliding and of being fixed.

Thus according to the above description the new apparatus is capable of being used in a great variety of ways and enables dressing, profiling, cutting of grooves and the like to be effected rapidly, conveniently and accurately in situ.

The new apparatus is also distinguished by being of simple construction and light in weight, and therefore extremely easy to handle. A further advantage of this device is that by reason of the unilateral arrangement of the base plate 1 the milling tool is unobstructed over a large region and therefore the new apparatus can be used for finishing work even on doors and windows that have already been installed, without hindrance by the base plate. A further great advantage of the new device consists in the fact that the tool, and therefore also the working point, is clearly visible, this too being due to the unilateral arrangement of the base plate and also to the narrowness of the annular extension 6.

I claim:

1. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler attached to the lateral extension, concentrically with the milling cutter spindle, and means for radial adjustment of the annular feeler in the direction of the base plate, the external diameter of the annular feeler corresponding to the fly circle diameter of the milling cutter.

2. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler whose external diameter corresponds to the fly circle diameter of the milling cutter, and an angular holder whose long arm is attached to the lateral extension of the milling cutter spindle while the annular feeler is formed as a slide and mounted on the short arm of the said holder in such a manner as to be capable of sliding radially on this arm and being locked thereon.

3. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler whose external diameter corresponds to the fly circle diameter of the milling cutter, an angular holder whose long arm is attached to the lateral extension of the base plate so as to be adjustable in the direction of the milling cutter spindle while the annular feeler is formed as a slide and mounted on the short arm of the said holder in such a manner as to be capable of sliding radially on this arm, and a fillister head screw provided in the holder, the head of this screw engaging in a suitable groove in the annular feeler, for locking the feeler on its arm.

4. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler whose external diameter corresponds to the fly circle diameter of the milling cutter, an angular holder, a screw bolt provided in the lateral extension, and a clamping unit threadably engaged thereon, for attaching the long arm of the holder to the lateral extension of the base plate, so as to be adjustable in the direction of the milling cutter spindle while the annular feeler is formed as a slide and mounted on the short arm of the said holder in such a manner as to be capable of sliding radially on this arm and of being locked thereon.

5. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, the motor being provided with an externally threaded neck portion in which the milling cutter spindle is mounted while the lateral extension is formed as a slotted clamp ring having an internal thread, which ring is used for adjustable mounting of the threaded neck, an annular feeler attached to the lateral extension, concentrically with the milling cutter spindle, and means for radial adjustment of the annular feeler in the direction of the base plate, the external diameter of the annular feeler corresponding to the fly circle diameter of the milling cutter.

6. An edge-dressing and profiling apparatus adapted to be advanced by hand, for woodworking, comprising a base plate having three slip surfaces on its under side provided in such a manner as to afford three-point support and a handle on top, a unit including an electric motor and a milling cutter spindle disposed perpendicularly to and outside the base plate, in a lateral extension thereof, means for axial adjustment of said unit, an annular feeler attached to the lateral extension, concentrically with the milling cutter spindle, and means for radial adjustment of the annular feeler in the direction of the base plate, the external diameter of the annular feeler corresponding to the fly circle diameter of the milling cutter.

7. An edge-dressing and profiling apparatus adapted to be advanced by hand, for woodworking, comprising a base plate having three slip surfaces on its under side provided in such a manner as to afford three-point support and a handle on top, a unit including an electric motor and a milling cutter spindle disposed perpendicularly to and outside the base plate, in a lateral extension thereof, the slip surface nearest to the milling cutter being so disposed as to be set back relatively to the milling cutter spindle in the direction opposite to the direction of advance, means for axial adjustment of said unit, an annular feeler attached to the lateral extension, concentrically with the milling cutter spindle, and means for radial adjustment of the annular feeler in the direction of the base plate, the external diameter of the annular feeler corresponding to the fly circle diameter of the milling cutter.

8. An edge-dressing and profiling apparatus adapted to be advanced by hand, for woodworking, comprising a base plate having three slip surfaces on its under side provided in such a manner as to afford three-point support, fastening means on the slip surfaces for attaching a larger slide plate, and a handle on top, a unit including an electric motor and a milling cutter spindle disposed perpendicularly to and outside the base plate, in a lateral extension thereof, means for axial adjustment of said unit, an annular feeler attached to the lateral extension, concentrically with the milling cutter spindle, and means for radial adjustment of the annular feeler in the direction of the base plate, the external diameter of the annular feeler corresponding to the fly circle diameter of the milling cutter.

9. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler whose external diameter corresponds to the fly circle diameter of the milling cutter, an angular holder whose long arm is attached to the lateral extension of the base plate so as to be adjustable in the direction of the milling cutter spindle while the annular feeler is formed as a slide and mounted on the short arm of the said holder in such a manner as to be capable of sliding radially on this arm and of being locked thereon, and guide rules adapted to be mounted on the holder in such a manner as to be capable of sliding and of being locked thereon, in place of the annular feeler.

10. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler whose external diameter corresponds to the fly circle diameter of the milling cutter, an angular holder whose long arm is attached to the lateral extension of the base plate so as to be adjustable in the direction of the milling cutter spindle while the annular feeler is formed as a slide and mounted on the short arm of the said holder in such a manner as to be capable of sliding radially on this arm and of being locked thereon, and guide rules having a recess for the milling cutter and adapted to be mounted on the holder in such a manner as to be capable of sliding and of being locked thereon, in place of the annular feeler.

11. An edge-dressing and profiling apparatus adapted to be advanced by hand, for woodworking, comprising a base plate having slip surfaces on its under side and a handle on top, a unit including an electric motor and a milling cutter spindle disposed perpendicularly to and outside the base plate, in a lateral extension thereof, means for axial adjustment of said unit, an annular feeler attached to the lateral extension, concentrically with the milling cutter spindle, the external diameter of the annular feeler corresponding to the fly circle diameter of the milling cutter, and a guide in the base plate in which alternatively the annular feeler or a guide rule can be mounted in such a manner as to be capable of sliding and being locked therein.

ROMAN SCHUSTER.

References Cited in the file of this patent
UNITED STATES PATENTS

| Number | Name | Date |
|---|---|---|
| 1,506,154 | Berthelsen et al. | Aug. 26, 1924 |
| 1,532,683 | Carter | Apr. 7, 1925 |
| 1,604,679 | Carter | Oct. 26, 1926 |
| 1,715,292 | Hoffman et al. | May 28, 1929 |
| 1,745,780 | Casey | Feb. 4, 1930 |
| 2,610,658 | Koeling | Sept. 16, 1952 |